K. W. THALHAMMER.
ELECTROPNEUMATIC PHOTO EXPOSURE APPARATUS.
APPLICATION FILED AUG. 12, 1909.
1,000,972.
Patented Aug. 15, 1911.
2 SHEETS—SHEET 1.
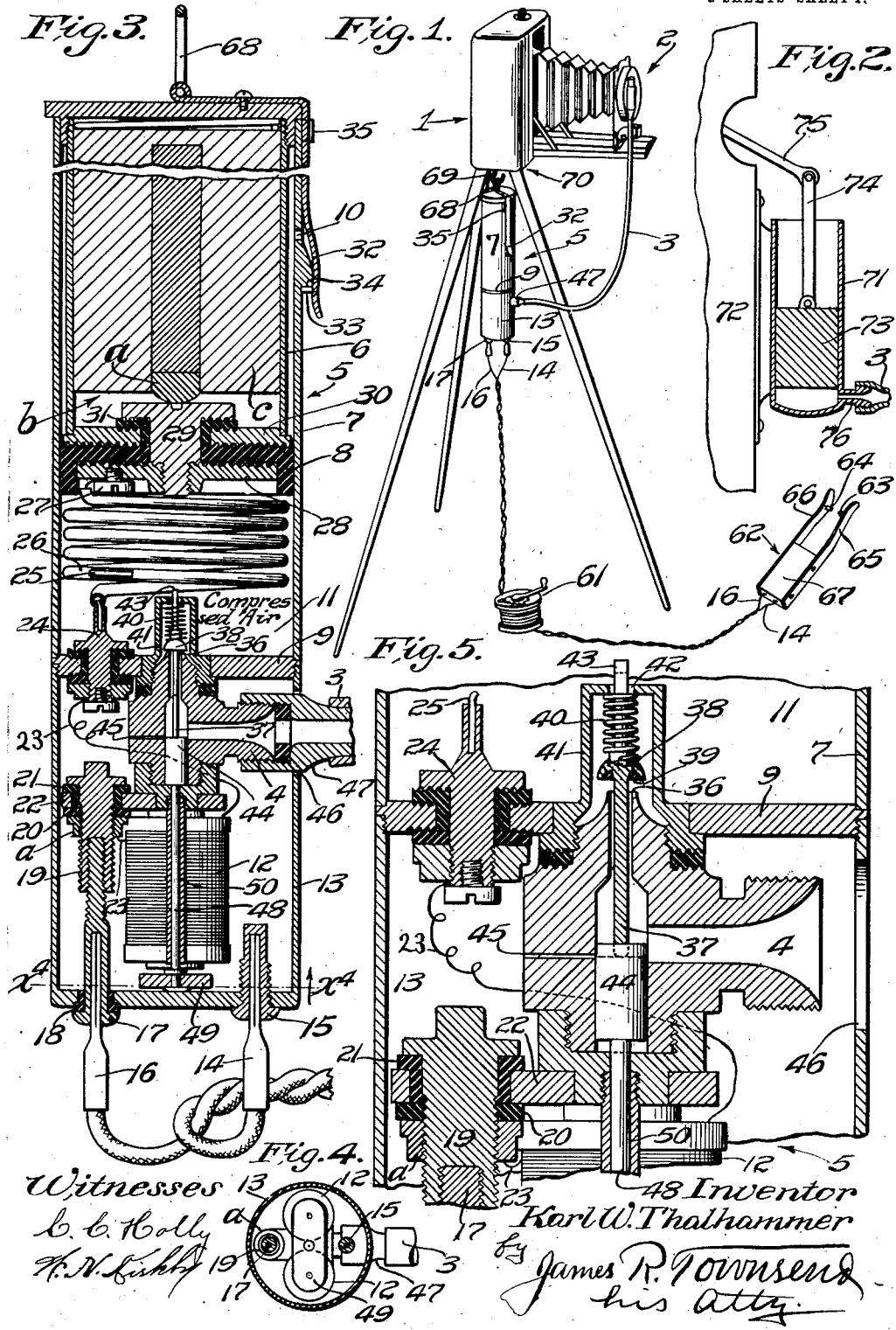

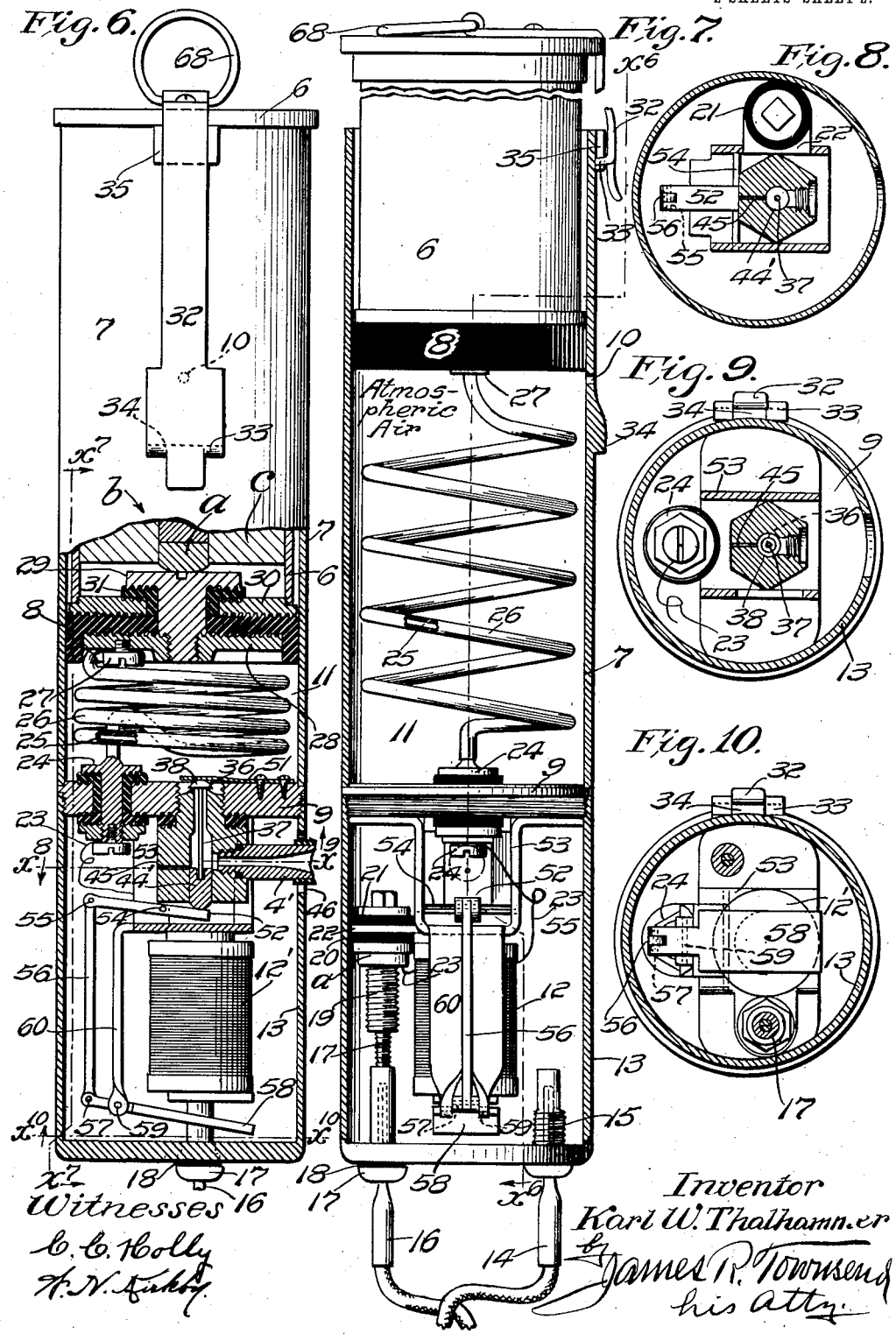

UNITED STATES PATENT OFFICE.

KARL W. THALHAMMER, OF LOS ANGELES, CALIFORNIA.

ELECTROPNEUMATIC PHOTO-EXPOSURE APPARATUS.

1,000,972. Specification of Letters Patent. Patented Aug. 15, 1911.

Application filed August 12, 1909. Serial No. 512,610.

*To all whom it may concern:*

Be it known that I, KARL W. THALHAMMER, a subject of Austria-Hungary, residing at Los Angeles, in the county of Los Angeles and State of California, have invented a new and useful Electropneumatic Photo-Exposure Apparatus, of which the following is a specification.

An object of this invention is to provide convenient means whereby a camera-shutter can be operated at a distance so that the person operating the camera can take his own picture.

It is frequently desired by those operating cameras to appear in the picture that is taken, and it often occurs that groups that are photographed in commemoration of a party or a gathering of friends are incomplete as to such party or group for the reason that one of the party is required to remain out of the group in order to operate the camera at the time the exposure is made. Or an individual may wish to appear in a scene he is photographing.

The object of this invention is to do away with the difficulty stated and to enable any person to conveniently cause the necessary exposure for his own photograph.

In carrying out this invention it is necessary to provide mechanism which will operate the camera-shutter without disturbing the camera so that the image upon the negative will be clear.

By this invention the operation of the shutter is effected without jarring or shaking the camera and the exposure may be as accurately timed as with the usual pneumatic shutter-closing devices.

The invention may be applied to cameras equipped with pneumatic means for operating the camera-shutter, and it may also be applied to cameras for which the means have not been provided. In the form of cameras which are operated by a push-button, a device operable by atmospheric pressure may be applied to actuate the push-button of the camera.

The invention is capable of embodiment in various forms.

I regard the invention as pioneer in that the operation of the pneumatic apparatus is initiated by means of an electro-magnet connected with a battery through a line having a switch that can be held in and controlled by the hand of the person whose photograph is to be taken.

The accompanying drawings illustrate the invention.

Figure 1 is a perspective view of a camera provided with this invention and in position for operation. Fig. 2 is a sectional detail of an air pump for working the push-button of a camera not provided with a pneumatic shutter closing device. Fig. 3 is a fragmental longitudinal section of one form of the motor; the parts being shown in set position. Fig. 4 is a section on line $x^4$—$x^4$ Fig. 3, looking in the direction of the arrow. Fig. 5 is an enlarged fragmentary view of the valve mechanism, the same being shown at the moment of operation. Fig. 6 is a view of a different form of motor partly in mid-section; the same being set as shown in Fig. 1. The section is taken on line $x^6$—$x^6$ Fig. 7. Fig. 7 is a view, partly in section, of said motor after it has become exhausted and has been extended for recharging with compressed air. The line $x^7$—$x^7$ in Fig. 6 indicates the plane from which the view is taken. The heads are not sectioned. Fig. 8 is a plan section on line $x^8$—$x^9$ of Fig. 6 looking down. Fig. 9 is a section on line $x^8$—$x^9$ looking up. Fig. 10 is a section on line $x^{10}$—$x^{10}$ Fig. 6 looking up.

The camera 1 may be of the usual construction provided with the usual shutter that is operated by the usual pneumatic shutter-operating mechanism 2 which is provided with a flexible tube 3 through which compressed air may be applied to such mechanism. Said flexible tube may be of the form that is ordinarily connected with a rubber pneumatic bulb, the bulb in this instance being omitted so that the tube may be connected with the air-nozzle 4 or 4′ of an air-compressor 5 that comprises the telescoping members which are preferably cylinders 6, 7, the cylinder 6 being provided with a piston 8 fitting inside the cylinder 7 that is provided at one end with a head 9 and intermediate its ends with a port 10 through which air may enter when the piston 8 is fully retracted for the purpose of drawing a charge of air into the air tank or chamber 11 formed in the member 7 by said piston and head.

The cylinder 7 is an electrical conductor, and a magnet 12 or 12′ is mounted in a cap 13 that is screwed on to the head 9 of said cylinder. The cap and the head are both electrical conductors. Two electrical conductors are carried by the cap 13, one of which said conductors, 14 is electrically connected by a socket 15 with the cap 13 and the other of which said conductors 16 is adapted to be inserted into the conducting socket 17 which is insulated from the cap 13 by the bushing 18, is threaded at its inner end and is screwed into and thus adjustably connected with the binding-post 19 which is insulated by the washer 20 and bushing 21 from the frame 22 that is connected with the head 9 and supports the magnet. Said magnet may be of any approved construction. In Figs. 3 and 4 a magnet provided with two spools is shown, and in Figs. 6 and 7 a magnet provided with but one spool is shown. The binding-post 19 is connected with one end of the winding 23 of the spool and the other end of said winding is connected through binding-post 24 with a conducting spring 25 provided with insulation 26 and connected with binding post 27, washer 28, and contact screw 29 with one pole $a$ of an electric battery $b$, the other pole $c$ of which is in electrical contact with the cylinder 6, which cylinder is electrically insulated from the cylinder 7 by the piston 8 which is a leather or rubber cup fastened by the washer 28 and the screw 29 to a head 30 insulated by the bushing 31 from the screw 29 and fixed to the telescoping member 6.

The outer telescoping member 7 has a greater length than the inner telescoping member 6 which carries the piston 8 and is provided with an elongated latch in the form of a spring 32 having a detent 33 for engaging a tooth 34 on the outer member 7, when the motor is charged by pushing the telescoping member 6 down into the air chamber 11 of the member 7 as shown in Figs. 3 and 6. 35 is another tooth at the upper end of the telescoping member 7 so that when the member 6 is extended as shown in Fig. 7, the detent will engage the tooth 35 to prevent the piston from being withdrawn from the member 7.

A valved port 36 is provided between the air chamber 11 and the air nozzle 4; the valve therefor being preferably in the form of a stem 37 provided with a cup-shaped head 38 in which is a packing 39 of very soft rubber or other suitable material. Said valve is normally held in closed position by a spring 40 mounted in a frame 41 having a hole 42 through which air may reach the port 36 and through which a guide 43 may extend; said guide being an extension of the stem 37 of the valve. When the valve is free the spring 40 will hold it in position to close the port 36. Said valve is also provided with a vent stopper 44 which is adapted to close the vent 45 whenever the valve is moved to open the port 36 so that when said port 36 is open, air may flow through the air nozzle 4 but will not flow through the vent 45; and when the valve seats upon the port 36 the valve stopper 44 clears the vent 45 thus to allow escape of air from the nozzle 4 to the atmosphere in the cap 13 which is not hermetically sealed; an opening 46 being provided therethrough to the open air to receive the tip 47 of the rubber tube 3.

Means are provided for operating the stopper 44 and valve 38 by the force of the magnet 12. In the form shown in Figs. 3 and 5 this is accomplished by connecting the stopper 44 by a rod 48 with an armature 49 of the magnet, said rod 48 being fixed to the armature and extending through a tube 50 that serves as a guide. When the magnet 12 in Figs. 3, 4 and 5 is energized the armature 49 will be drawn against the pressure of the spring 40 to open the port 36, and when the magnet is deënergized the spring returns the valve to close the port 36.

In the form shown in Figs. 6 and 7 the plug 44' is held closed by the flat spring 51 and the plug 44' is movable to operate the valve against such spring, the means to operate the plug 44' being a lever 52 pivoted to the frame 53 by a pivot 54 and connected by a pivot 55, connecting rod 56 and pivot 57 with a lever 58 the long arm of which is an armature operable by the magnet 12', said lever 58 being pivoted at 59 to an arm 60 of the frame 53.

The conductors 14 and 16 are wound around a reel 61 and led thence to a switch 62 having contact points 63 and 64 carried by springs 65, 66 mounted on an insulating block 67. Said switch and its electric circuit, including a suitable source of electric energy, afford means to control the magnet and consequently the motor from a distance.

In practice the motor may be charged by forcing the telescoping member 6 into the telescoping member 7 to compress the air in the chamber 11. When the member 6 has been fully depressed the detent 33 will engage the tooth 34 and thus retain the members of the motor in charged position as shown in Figs. 1, 3 and 6. Then the motor may be hung by its ring 68 on the hook 69 on the under side of the head of the tripod 70 of the camera. The force of the spring 40 and the compressed air holds the valve head 38 down to close the port 36. The operator may then focus the camera 1 on the scene to be photographed and may then with switch in hand, station himself at any desired distance from the camera, and in its range and focus if desired, and may then close the switch thus energizing the armature thereby opening the valve to admit compressed air to the rubber tube to operate the shutter and make the exposure. The valve will remain open and the vent closed so long as the magnet is energized.

The air compressor of the motor may be of sufficient capacity to operate the shutter a number of times so that various forms of exposure devices may be operated, two, three or more actuations of the mechanism being possible by as many closing and opening operations of the switch. When it is again desired to charge the motor with compressed air, the latch 32 will be released from the tooth 34, and the telescoping inner member 6 will be drawn out into position shown in Fig. 7. The spring connection 25 being coiled allows the distention of the members of the air compressor to occur, until the port 10 is passed by the piston 8 and thereupon the tank will become filled with air, and the tooth 35 intercepts the latch 32, thus stopping the piston, as shown in Fig. 6, thus compressing a charge of air in the tank 11, and then the apparatus is again ready for use.

In Fig. 2 pneumatic mechanism for operating the shutter is shown consisting of a cylinder 71 fixed to the camera frame 72 and provided with a piston 73 that is connected by a connecting-rod 74 with the shutter operating arm 75. The cylinder 71 is provided with a nipple 76 to which the flexible tube 3 is applied.

In operating the pneumatic shutter closing apparatus, shown in Fig. 2, to set the apparatus, the arm 75 will be returned by the usual means, not shown, thus bringing the piston 73 in position shown in Fig. 2, ready to be again actuated when a new charge of compressed air is applied.

I claim:—

1. The combination in electro-pneumatic photo exposure apparatus of an air-tank having an outlet, a valve normally closing the outlet, means to compress air in the tank, and electro-magnetic means to open the valve.

2. The combination in electro-pneumatic photo exposure apparatus of pneumatic mechanism for operating a camera shutter, an air-tank provided with an outlet, means to compress air in the air-tank, a tube leading from such outlet to said pneumatic mechanism, a valve to normally close the outlet, and electro-magnetic means to open the valve.

3. The combination in electro-pneumatic photo exposure apparatus, of two telescoping members, one of which constitutes an air-tank and the other a piston to compress air in said tank, a latch to hold the piston when a charge of air is compressed thereby, a valved outlet from the air-tank, an electro-magnet to operate the valve and means to control the magnet.

4. An electro-pneumatic photo exposure apparatus set forth comprising two telescoping members, one of which is provided with an air-tank and the other with a piston to compress air in such tank, a latch to hold the piston in position to hold the air compressed, a valved outlet for said air-tank, a battery in one of said members, an electro-magnet carried by the other member and having an armature arranged to operate the valve of said outlet, electrical conductors connected with said battery and magnet, and a switch to open and close the circuit between the battery and magnet.

5. The electro-pneumatic photo exposure apparatus set forth comprising two telescoping electrically connected conducting members, one of which constitutes an air-tank, a piston on the other of said members to compress air in said tank, means to hold the piston in position to hold the air compressed, a valved outlet for the air-tank, a battery in the member that is provided with the piston, one pole of said battery being electrically connected with the last-mentioned member, an electro-magnet carried by the other member, and having an armature, flexible conductors electrically connected with opposite poles of the battery through the magnet to produce an electric circuit, a switch to close the circuit, and valve operating means between the valve and the armature of the magnet.

6. Means for operating a camera shutter substantially as set forth which consist of two telescoping members to compress air, a valved outlet for such compressed air, an electro-magnet to open the valve, a spring to normally close the valve, an electric circuit to operate the magnet, and a tube to conduct air from the outlet to the apparatus for operating the camera shutter.

7. In an apparatus for operating a camera shutter the combination of an air compressor, means for holding compressed air therein, an outlet for the compressed air, a valve for said outlet, a spring to hold the valve closed, an electro-magnet having an armature to open the valve and an electric circuit including a switch to operate the magnet.

8. The combination in an electro-pneumatic photo exposure apparatus of an air compressor, an outlet for the compressed air, a valve to close the outlet, a spring to hold the valve closed, an electro-magnet having an armature to open the valve, an electric circuit including a switch to operate the magnet, a pneumatic tube to conduct the air from said outlet, a vent being provided between said tube and the valved outlet and a stopper connected with the valve to open the vent when the valve is closed and to close the vent when the valve is open.

In testimony whereof, I have hereunto set my hand at Los Angeles, California, this 7th day of August, 1909.

KARL W. THALHAMMER.

In presence of—
  JAMES R. TOWNSEND,
  L. BELLE RICE.